J. H. COLLIE.
MULTIPLE CABLE GLAND FOR BULKHEADS AND THE LIKE AND PLASTIC FILLING COMPOUND THEREFOR.
APPLICATION FILED JAN. 13, 1919.
1,393,089.
Patented Oct. 11, 1921.
2 SHEETS—SHEET 1.
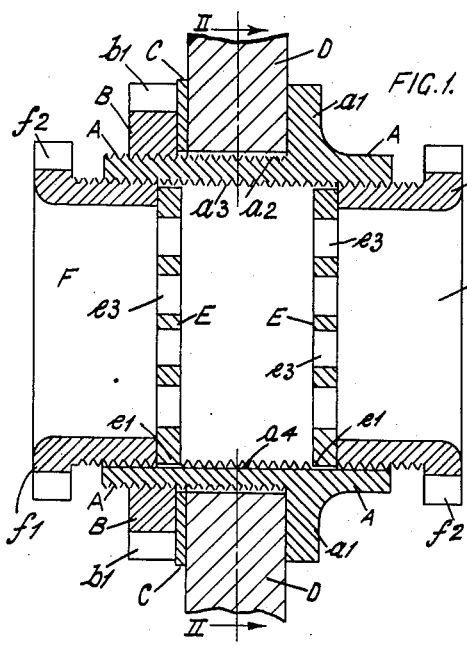
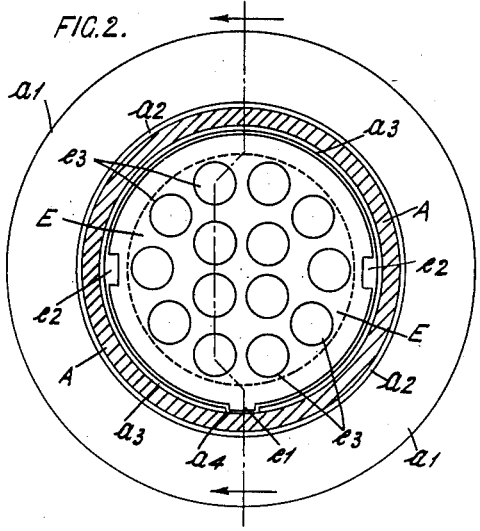
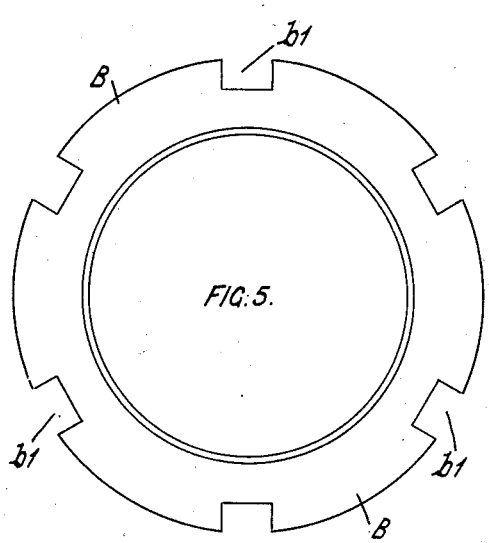
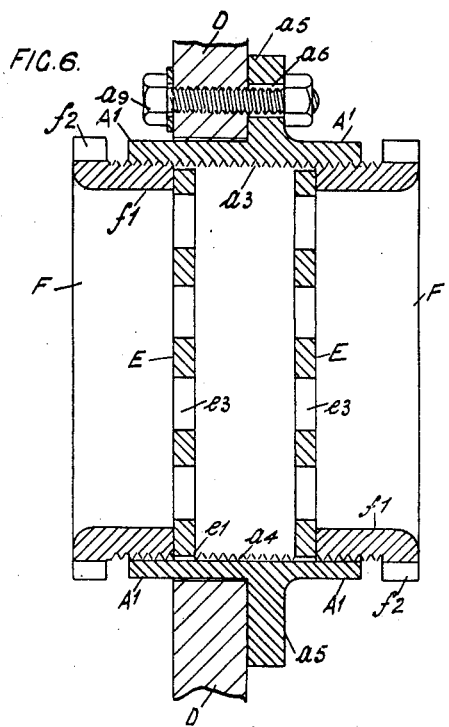
Inventor:
James Hunter Collie,

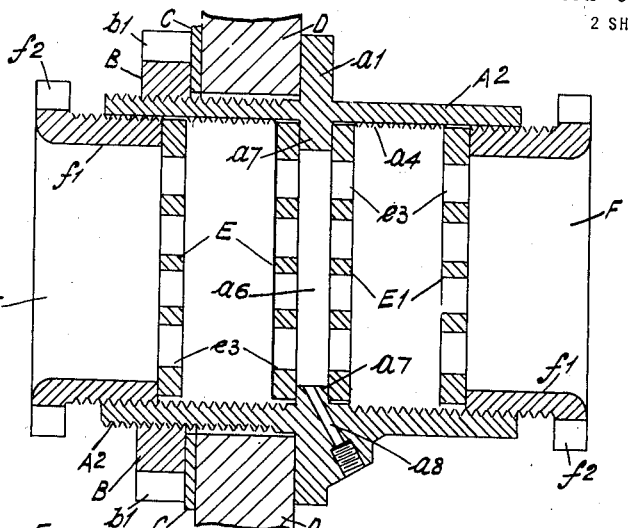
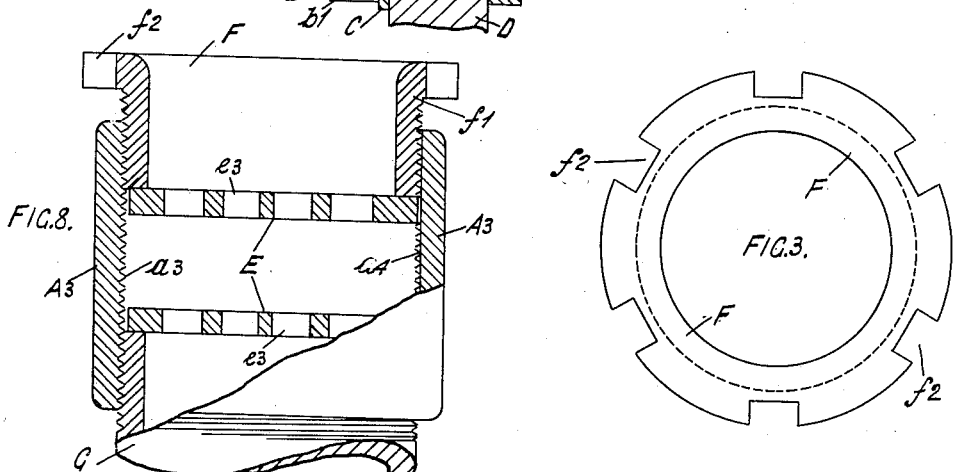
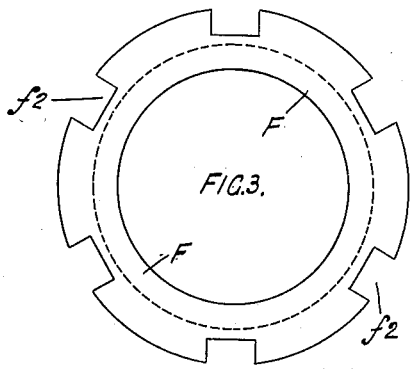
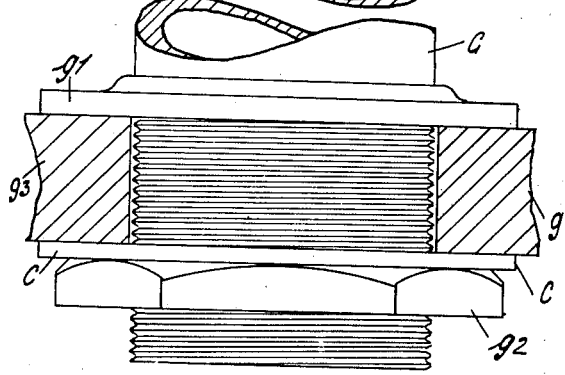
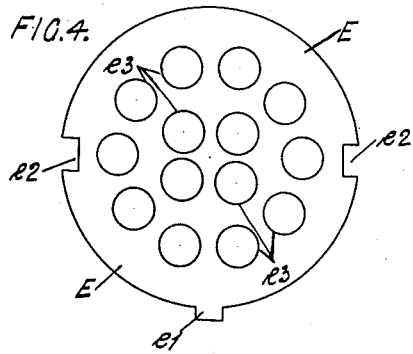

UNITED STATES PATENT OFFICE.

JAMES HUNTER COLLIE, OF BIRKENHEAD, ENGLAND.

MULTIPLE-CABLE GLAND FOR BULKHEADS AND THE LIKE AND PLASTIC FILLING COMPOUND THEREFOR.

1,393,089.  Specification of Letters Patent.  Patented Oct. 11, 1921.

Application filed January 13, 1919. Serial No. 270,971.

*To all whom it may concern:*

Be it known that I, JAMES HUNTER COLLIE, a subject of the King of Great Britain, residing in Birkenhead, in the county of Chester, England, have invented certain new and useful Improvements in Multiple - Cable Glands for Bulkheads and the like and Plastic Filling Compounds Therefor, of which the following is a specification.

This invention relates to multiple cable glands such as are employed when a series of electric cables have to pass in water-tight manner through the bulkheads and the like by which ships are divided into water-tight compartments.

According to the present invention the casing may comprise an internally and (or) externally screwed sleeve passing through the bulkhead and having external flanges or the like by means of which a water-tight joint is made between the casing and the bulkhead; the casing is fitted with two end-plates or disks perforated to take the cables and with two tubular gland nuts fitting the screwed interior of the casing and adapted to force the end plates axially toward each other, and the space in the casing between the end-plates is filled with a plastic compound which does not set hard, but maintains indefinitely a stiff consistency, so that repairs can be effected easily and new cables inserted when required.

The invention is illustrated in the accompanying drawings, in which:—

Figure 1 is an elevation in longitudinal section.

Fig. 2 an end elevation in transverse section on the line II, II, of Fig. 1.

Figs. 3, 4 and 5 are, respectively face views of a gland nut, a perforated compression plate, and a fastening nut.

Figs. 6 and 7 are views similar to Fig. 1, and illustrate modified forms of gland casing, and, Fig. 8 is an elevation, partly in medial section, showing the improved gland applied to a deck tube.

Referring first to Figs. 1 to 5:—

A is the casing, flanged as at $a^1$ and provided with a fastening nut B which screws on to the externally threaded part $a^2$ of the casing and which by means of a suitable washer or washers C makes the necessary fluid-tight joint between the bulk-head D and the casing; the nut may be provided with any suitable means for screwing up; in the drawings slots $b^1$ are provided for this purpose.

The interior of the gland casing is screw-threaded as shown at $a^3$ and is provided with one or more longitudinal key-ways $a^4$.

The end plates or disks E which form the compression plates have a key or feather $e^1$ which fits the key-way $a^4$ or, of course, as many such keys as there are key-ways and it is also provided with notches $e^2$ (Fig. 4) to take the hooked end of an extracting tool used to withdraw the compression plates; the diameter of the compression plate is slightly less than that of the screw-threaded bore of the casing. The compression plates are drilled with multiple holes $e^3$ to take the necessary number of cables for which the gland is designed, the holes in the two plates being drilled in register with the key-ways so as to be in alinement when the plates are inserted in the gland casing; the holes are made slightly larger in diameter than the external diameter of the cables which pass through them, and various patterns of drilling are adapted to suit the number and sizes of the cables.

F are the gland nuts externally screw-threaded to fit the screw threads $a^3$ and each is provided with a flange $f^1$ slotted as at $f^2$ to enable the nuts to be screwed up.

The compound is prepared as follows:—

An elastic mineral pitch, a mineral rubber and a suitable hydro-carbon oil are thoroughly mixed in proportions (which depend upon the plasticity of the two first-mentioned ingredients) necessary to provide a consistency and degree of fluidity such as will insure a plastic paste when the said mixture has incorporated with it about 60 per cent. by weight of shredded asbestos, talc, silicate cotton, or organic fibrous material, plus a percentage of graphite, the mixture being adapted to absorb the more or less fluid compound. The resulting product is a plastic semi-solid compound which will not set even when subjected to the extreme temperatures experienced in the usual positions of such glands.

In making the joint one of the perforated end plates is inserted in the casing and held in position by the tubular nut; the casing is charged with the plastic compound and the other perforated end plate is inserted and held by its tubular nut; the end plates are provided with feathers fitting an axial key-way, or with other suitable means to maintain in alinement the sets of holes in them to take the required number and sizes of cables.

The cables are then inserted in succession by being pushed through the appropriate pair of holes and the intervening plastic compound, a passage through the compound being made, if necessary, by the insertion, in the first instance, of a tapered rod.

When all the cables have been inserted, the end plates are forced axially together until the plastic compound oozes out between the cables and the holes in the end plates, which holes are slightly larger in diameter than the cables. The pressure to which the plastic compound is subjected to effect this insures the filling up by the compound of all interstices between the respective cables and between the latter and the interior of the casing.

Any one or more of the cables may with facility be withdrawn and replaced, and should it be desired to renew the compound, the old compound in the box can be easily forced out, by, say, removing one of the end plates and propelling the other through the casing, the interior of which is continuously screw-threaded.

In cases where the cables are of the lead covered or armored type, it is not necessary that the compound should possess highly insulating characteristics, but where this is desired, as for instance, with vulcanized rubber cables as bare conductors, the compound, if talc be used as the absorbent, may be made to possess the desired insulating qualities.

In Fig. 6 the construction is similar to that described, except that the gland casing A' is attached to the bulk-head by bolts or screws $a^9$ passing through holes $a^6$ in the flange $a^5$.

In Fig. 7 the construction is similar to Figs. 1 and 6 except that two pairs of compression plates E, E, and E', E', are fitted in the casing $A^2$ so as to leave a central testing chamber $a^{6\prime}$ which is required in some applications to permit the tightness of the gland joints to be tested from time to time without disturbing the joints, by an applied fluid pressure.

A central flange $a^7$ is provided against which the inner pair of plates abut. The central space $a^6$ is fitted with a passage-way $a^8$ tapped to take either a closing plug or the screwed end of a testing pipe by which the testing pressure is applied. The spaces between the plates E, E, and E', E', respectively are filled with a non-setting plastic compound as described.

Where the cables pass through a deck it is usual to fit a deck-tube G as shown in Fig. 8 so as to locate the water-tight gland above the level of the deck; the tube passes through and is jointed to the deck plate by any suitable means such as the flange $g^1$ and nut $g^2$ and the gland is fitted at the upper end of the tube.

A gland of the type herein described may be fitted to such tubes by forming the gland of a short length of tube $A^3$ internally screwed to take the screwed part of the deck tube and to take the gland nut F. The bore of $A^3$ has a key-way $a^4$ and the compression plates E are constructed as described; the lower plate abuts against the end of the deck-tube, and the upper one is forced in by the gland-nut, the space between is filled with the non-setting compound, and the construction and mode of making the joint is similar to that described.

The construction, in respect to the mode of attachment of the gland casing to the bulk-head and as to the mode of forcing the compression plates into the gland and retaining them therein, may be modified and the composition of the plastic compound may also be varied, provided that the semi-fluid part will not set or crack and that the fibrous part has the necessary absorbent and binding properties to retain the composition *in situ*.

Certain vegetable products, such as ground palm kernels, in which the oily constituents are held by absorption in the more solid or fibrous constituents, may be used as a filling composition.

An advantage of considerable importance possessed by the present invention is, that the space between the compression plates can be filled by the compound before the cables are threaded through; this insures the filling up of all spaces and is not practicable when, as according to existing practice, the gland is filled with hot liquid compound which sets after cooling.

Having now fully described my invention, I declare that what I claim, and desire to secure by Letters Patent is:—

1. Means for making a water-tight joint between a cable and a bulkhead or the like comprising an interiorly threaded gland casing provided with means to secure it to an opening in said bulkhead, perforated compression plates within the casing, an exteriorly threaded member engaging each compression plate, and fitting the casing, and a non-setting plastic compound located between the compression plates.

2. The device of claim 1 in which the plastic compound is composed of a fibrous absorbent material, and a fluid incorporated therewith.

3. Means for making a water-tight joint between multiple cables and a bulkhead or the like, in combination; a gland casing provided with means for securing said casing in an opening in the bulkhead; two pairs of compression plates perforated to take the cables, fitting transversely across the bore of said casing; the inner plates of the respective pairs being separated by a suitable distance piece to form a testing chamber; a port in the gland casing communicating with the said chamber; means for moving the outer plates of the respective pairs inwardly in alinement; and a non-setting plastic compound located in the gland casing between the respective pairs of said plates; substantially as described.

In witness whereof I have set my hand in presence of two witnesses.

JAMES HUNTER COLLIE.

Witnesses:
DOUGLAS S. GREIG,
M. THOMLINSON.